US011429698B2

(12) United States Patent
Geng

(10) Patent No.: US 11,429,698 B2
(45) Date of Patent: Aug. 30, 2022

(54) METHOD AND APPARATUS FOR IDENTITY AUTHENTICATION, SERVER AND COMPUTER READABLE MEDIUM

(71) Applicant: Beijing Elex Technology Co., Ltd., Beijing (CN)

(72) Inventor: Yongjiang Geng, Beijing (CN)

(73) Assignee: Beijing Elex Technology Co., Ltd., Beijing (CN)

( * ) Notice: Subject to any disclaimer, the term of this patent is extended or adjusted under 35 U.S.C. 154(b) by 261 days.

(21) Appl. No.: 16/652,644

(22) PCT Filed: Aug. 21, 2018

(86) PCT No.: PCT/CN2018/101461
§ 371 (c)(1),
(2) Date: Mar. 31, 2020

(87) PCT Pub. No.: WO2019/148815
PCT Pub. Date: Aug. 8, 2019

(65) Prior Publication Data
US 2020/0242223 A1    Jul. 30, 2020

(30) Foreign Application Priority Data

Feb. 5, 2018   (CN) .......................... 201810113381.2

(51) Int. Cl.
*G06F 21/31*   (2013.01)
*H04L 9/40*    (2022.01)
*H04L 67/50*   (2022.01)

(52) U.S. Cl.
CPC ........ *G06F 21/316* (2013.01); *H04L 63/0876* (2013.01); *H04L 67/535* (2022.05); *H04L 2463/082* (2013.01)

(58) Field of Classification Search
CPC ... G06F 21/316; H04L 63/0876; H04L 67/22; H04L 2463/082
See application file for complete search history.

(56) References Cited

U.S. PATENT DOCUMENTS

| 2012/0137340 A1* | 5/2012 | Jakobsson ............. H04L 63/102 726/21 |
| 2013/0054433 A1* | 2/2013 | Giard .................... G06F 21/316 709/224 |

(Continued)

FOREIGN PATENT DOCUMENTS

| CN | 105049421 A | 11/2015 |
| CN | 105357213 A | 2/2016 |

(Continued)

OTHER PUBLICATIONS

Extended European Search Report issued in EP Application Serial No. 18903447.3, dated Oct. 1, 2021.

(Continued)

*Primary Examiner* — Chau Le
(74) *Attorney, Agent, or Firm* — Leydig, Voit & Mayer, Ltd.

(57) ABSTRACT

The embodiments of the present disclosure relate to information processing technology and provide a method for identity authentication, capable of effectively improving security and accuracy in identity authentication. The method includes: receiving an authentication request transmitted from a client, the authentication request carrying identity authentication information of a user; authenticating the identity authentication information; collecting behavior characteristic information related to the user in a number of dimensions when the identity authentication information is determined to be valid; matching and recognizing an identity of the user by comparing the collected behavior characteristic information with original characteristic information in (Continued)

the respective dimensions. The embodiments of the present disclosure can be applied in a process for user identity authentication.

15 Claims, 5 Drawing Sheets

(56) References Cited

U.S. PATENT DOCUMENTS

| | | | |
|---|---|---|---|
| 2013/0055381 | A1 | 2/2013 | Hao et al. |
| 2015/0032821 | A1 | 1/2015 | Chen et al. |
| 2015/0046989 | A1* | 2/2015 | Oberheide .............. G06F 21/31 726/6 |
| 2015/0324563 | A1* | 11/2015 | Deutschmann ......... H04L 29/08 726/7 |
| 2016/0055326 | A1* | 2/2016 | Votaw ..................... G06F 21/45 726/19 |
| 2016/0189153 | A1* | 6/2016 | Luk ...................... G06Q 20/405 705/44 |
| 2017/0230417 | A1 | 8/2017 | Amar et al. |
| 2017/0230418 | A1* | 8/2017 | Amar ...................... H04L 63/20 |
| 2017/0289168 | A1* | 10/2017 | Bar ........................ H04L 63/102 |
| 2017/2089168 | | 10/2017 | Bar et al. |

FOREIGN PATENT DOCUMENTS

| | | |
|---|---|---|
| CN | 105991281 A | 10/2016 |
| CN | 106790129 A | 5/2017 |
| CN | 106919816 A | 7/2017 |
| CN | 107169499 A | 9/2017 |
| CN | 107623696 A | 1/2018 |
| CN | 107632722 A | 1/2018 |
| GB | 2524010 A | 9/2015 |
| JP | 2003099403 A | 4/2003 |
| JP | 2008158683 A | 7/2008 |
| JP | 2011059837 A | 3/2011 |
| JP | 2014149811 A | 8/2014 |
| JP | 2015088122 A | 5/2015 |
| JP | 2017021403 A | 1/2017 |
| JP | 2017138729 A | 8/2017 |
| JP | 2017207978 A | 11/2017 |
| WO | WO 2011001026 A1 | 1/2011 |

OTHER PUBLICATIONS

State Intellectual Propeorty Office of the P.R. China, International Search Report in Chinese Application No. PCT/CN2018/101461 (dated Oct. 31, 2018).
Chinese First Office Action issued in CN 201810113381 dated Jan. 3, 2020.
Japanese Notice of Reasons for Refusal issued in JP 2020-514963 dated Apr. 26, 2021.
Decision to Grant issued in JP2020-514963 dated Jan. 6, 2022.

* cited by examiner

METHOD AND APPARATUS FOR IDENTITY AUTHENTICATION, SERVER AND COMPUTER READABLE MEDIUM

CROSS-REFERENCE TO RELATED APPLICATIONS

This patent application is the U.S. national phase of International Application No. PCT/CN2018/101461, filed on Aug. 21, 2018, which claims priority to Chinese Patent Application No. 201810113381.2, filed on Feb. 5, 2018. The disclosures of the aforementioned applications are hereby incorporated by reference in their entireties.

TECHNICAL FIELD

The present disclosure relates to information processing technology, and more particularly, to a method and an apparatus for identity authentication, a server and a computer readable medium.

BACKGROUND

Identity authentication is a process of verifying an operator's identity in a computer network. With the rapid development of mobile smart terminals, it has become increasingly popular to perform such identity authentication process on a mobile smart terminal, e.g., in application (app) account login or online payment.

Currently, there are various identity authentication schemes that are commonly used, including static password, smartcard, dynamic password, Short Message Service (SMS) password, digital signature, biological identification, and the like. Typically, when a user logs in an account for the first time on a mobile phone, he/she will be authenticated by means of account plus static password. In order to further enhance the security of the authentication, when a user has not logged in for a long time or when another factor has changed, the identity authentication will be performed by means of challenge. That is, the user is further required to enter a static password, and then a dynamic password is sent to the user's mobile phone which was used in registration, and next the user enters the SMS password. While such "challenging" scheme for identity authentication has an improved password security, it limits the convenience and flexibility in the user identity authentication process. Furthermore, as the cloud computing technique evolves rapidly these days, hackers can perform brute force attacks by controlling thousands or tens of thousands of servers.

If a user's application account is cracked by brute force attacks, the user's virtual assets, such as game currency or game equipment, will be lost. Moreover, the chat information between the user and other users may be leaked and the user may suffer from a property loss.

To summarize, there may be some security problems in the identity authentication processes on mobile smart terminals. It is thus desired to provide a method capable of improving the overall security of user identity authentication processes on mobile smart terminals.

SUMMARY

In view of the above, the embodiments of the present disclosure provide a method and an apparatus for identity authentication, a server and a computer readable medium, capable of effectively improving security and accuracy in identity authentication.

In a first aspect, a method for identity authentication is provided according to an embodiment of the present disclosure. The method includes: receiving an authentication request transmitted from a client, the authentication request carrying identity authentication information of a user; authenticating the identity authentication information; collecting behavior characteristic information related to the user in a number of dimensions when the identity authentication information is determined to be valid; and matching and recognizing an identity of the user by comparing the collected behavior characteristic information with original characteristic information in a respective one of the dimensions.

Further to the above aspect and any of the embodiments, an embodiment is provided, in which the method further includes, prior to receiving the authentication request transmitted from the client: receiving login information transmitted from the client and extracting from the login information hardware device information and software description information of the user; collecting operation behavior information of the user on the client via a data collection interface of the client; and determining the hardware device information, software description information and operation behavior information of the user as the original characteristic information.

Further to the above aspect and any of the embodiments, an embodiment is provided, in which the operation of matching and recognizing the identity of the user by comparing the collected behavior characteristic information with the original characteristic information in the respective dimensions includes: calculating a matching degree between each piece of the collected behavior characteristic information and the original characteristic information in the corresponding dimension; determining the identity of the user to be invalid when the matching degree corresponding to at least one piece of the behavior characteristic information exceeds a specified threshold; and determining the identity of the user to be valid when the matching degree corresponding to none of the behavior characteristic information exceeds the specified threshold.

Further to the above aspect and any of the embodiments, an embodiment is provided, in which the method further includes, subsequent to matching and recognizing the identity of the user by comparing the collected behavior characteristic information with the original characteristic information in the respective dimensions: updating the stored original characteristic information and the corresponding specified threshold based on the collected behavior characteristic information and a corresponding result of the matching and recognizing of the identity.

Further to the above aspect and any of the embodiments, an embodiment is provided, in which the method further includes: receiving a characteristic information modification request transmitted from the client; re-collecting the hardware device information and software description information of the user in response to the characteristic information modification request; and updating the original characteristic information with the re-collected hardware device information and software description information.

In a second aspect, an apparatus for identity authentication is provided. The apparatus includes: a first receiving unit configured to receive an authentication request transmitted from a client, the authentication request carrying identity authentication information of a user; an authenticating unit configured to authenticate the identity authentication information; a first collecting unit configured to collect behavior characteristic information related to the user in a number of dimensions when the identity authentication information is determined to be valid; and a matching and recognizing unit configured to match and recognize an identity of the user by comparing the collected behavior characteristic information with original characteristic information in the respective dimensions.

Further to the above aspect and any of the embodiments, an embodiment is provided, in which the apparatus further includes: a second receiving unit configured to receive login information transmitted from the client and extract from the login information hardware device information and software description information of the user; a second collecting unit configured to collect operation behavior information of the user on the client via a data collection interface of the client; and a determining unit configured to determine the hardware device information, software description information and operation behavior information of the user as the original characteristic information.

Further to the above aspect and any of the embodiments, an embodiment is provided, in which the matching and recognizing unit includes: a calculating module configured to calculate a matching degree between each piece of the collected behavior characteristic information and the original characteristic information in the corresponding dimension; and a determining module configured to determine the identity of the user to be invalid when the matching degree corresponding to at least one piece of the behavior characteristic information exceeds a specified threshold, and determine the identity of the user to be valid when the matching degree corresponding to none of the behavior characteristic information exceeds the specified threshold.

Further to the above aspect and any of the embodiments, an embodiment is provided, in which the apparatus further includes: a first updating unit configured to update the stored original characteristic information and the corresponding specified threshold based on the collected behavior characteristic information and a corresponding result of the matching and recognizing of the identity.

Further to the above aspect and any of the embodiments, an embodiment is provided, in which the apparatus further includes: a third receiving unit configured to receive a characteristic information modification request transmitted from the client; a third collecting unit configured to re-collect the hardware device information and software description information of the user in response to the characteristic information modification request; and a second updating unit configured to update the original characteristic information with the re-collected hardware device information and software description information.

In a third aspect, a server is provided. The server includes a processor, a memory, a communication interface and a bus. The memory stores computer executable instructions, the processor is connected to the memory via the bus, and when the server is operating, the processor executes the computer executable instructions stored in the memory to cause the server to perform the method according to any of the embodiments of the first aspect.

In a fourth aspect, a computer readable medium is provided. The computer readable medium has a computer program stored thereon. The program, when executed by a processor, performs the method according to any of the embodiments of the first aspect.

The embodiments of the present disclosure provide a method and an apparatus for identity authentication, a server and a computer readable medium. In addition to authentication based on identity authentication information, behavior characteristic information indicative of a user's habit is used to analyze the user's behavior habit, so as to determine whether the user currently logging in is consistent with a historical user. When compared with the conventional single authentication scheme, it is possible to improve the security and accuracy of the identity authentication.

BRIEF DESCRIPTION OF DRAWINGS

In order to more clearly illustrate technical solutions of embodiments of the present disclosure, the accompanying drawings used in the embodiments are briefly described below. The drawings described below are merely a part of the embodiments of the present disclosure. Based on these drawings, those skilled in the art can obtain other drawings without any creative effort.

DESCRIPTION OF EMBODIMENTS

Figure 1:
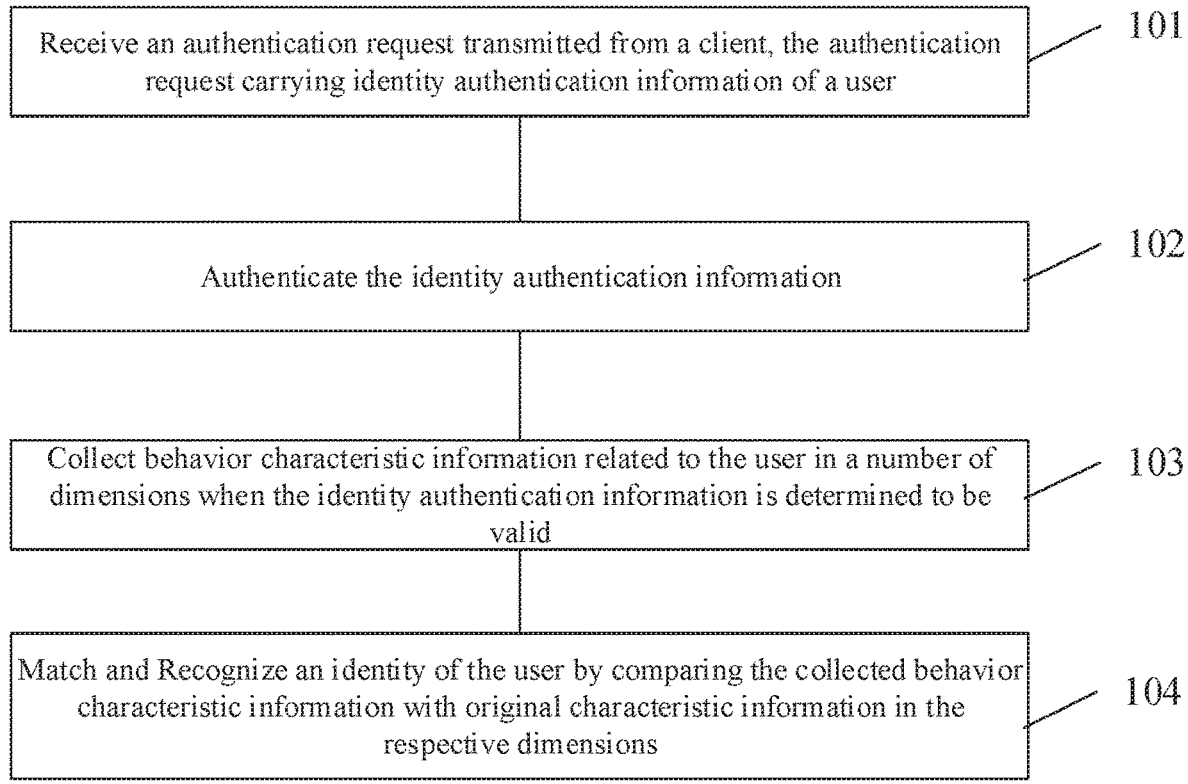
FIG. 1 is a flowchart illustrating a method for identity authentication according to an embodiment of the present disclosure.

In order to better understand technical solutions of the present disclosure, the embodiments of the present disclosure are described in details with reference to the drawings.

It should be clear that the described embodiments are merely part of the embodiments of the present disclosure rather than all of the embodiments. All other embodiments obtained by those skilled in the art without paying creative labor shall fall into the protection scope of the present disclosure.

The terms used in the embodiments of the present disclosure are merely for the purpose of describing specific embodiment, rather than limiting the present disclosure. The terms "a", "an", "the" and "said" in a singular form in the embodiments of the present disclosure and the attached claims are also intended to include plural forms thereof, unless noted otherwise.

It should be understood that the term "and/or" used in the context of the present disclosure is to describe a correlation relation of related objects, indicating that there may be three relations, e.g., A and/or B may indicate only A, both A and B, and only B. In addition, the symbol "/" in the context generally indicates that the relation between the objects in front and at the back of "/" is an "or" relationship.

It should be understood that although the terms 'first', 'second' and 'third' may be used in the present disclosure to describe elements, the elements should not be limited to these terms. These terms are used only to distinguish the elements from each other. For example, without departing from the scope of the embodiments of the present disclosure, a first element may also be referred to as a second element. Similarly, the second element may also be referred to as the first element.

Depending on the context, the term "if" as used herein can be interpreted as "when", "in a case where", "in response to determining . . . " or "in response to detecting . . . ". Similarly, depending on the context, the phrase "if it is determined . . . " or "if it is detected . . . (a statement of a condition or event)" can be interpreted as "when it is determined . . . ", "in response to determining . . . ", "when it is detected . . . (a statement of a condition or event)", or "in response to detecting . . . (a statement of a condition or event)".

According to an embodiment of the present disclosure, a method for identity authentication is provided. The method can be performed at a server corresponding to a client.

A user device, as used in the embodiment of the present disclosure, refers to a device providing a user with data connectivity. The user can log in his/her account using a client installed on the user device for identity authentication. The user device can be e.g., a mobile terminal .e.g., a smart phone, a table computer or a vehicle mounted mobile device having various application functions.

The server, as used in the embodiment of the present disclosure, refers to a device providing a computing device for the user identity authentication. It can respond to a service request and can have capabilities for providing and maintaining services. It may include a processor, a hard drive, a memory and a system bus.

As shown in FIG. 1, the method includes the following steps.

At 101, an authentication request transmitted from a client is received. The authentication request carries identity authentication information of a user.

Here, the identity authentication information can be entered by the user when logging in an account or can be stored at the client and filled automatically. Typically, it can include various information such as a user name, a password, a digital certificate, and the like.

At 102, the identity authentication information is authenticated.

At 103, when the identity authentication information is determined to be valid, behavior characteristic information related to the user in a number of dimensions is collected.

Unlike the above identity authentication information, the behavior characteristic information in the embodiment of the present disclosure refers to hardware device information, software description information and operation behavior information. The dimensions of the behavior characteristic information refers to types of information that can be collected among the above three types of behavior characteristic information.

Here, the hardware device information may include information in a number of dimensions, such as a physical location of a user device, a network environment the user device accesses, a device model, a processor model, a model, specification and capacity of a memory and a screen size of the user device.

The software description information may include information in a number of dimensions, such as a name, storage path, version number, operating system type and operating system version of the client and a language used in the client.

The operation behavior information may include information in a number of dimensions, such as a sliding trajectory of a touch operation by the user on a touch screen, a consumption or payment behavior on the client, and behaviors of processing various operation objects in applications.

At 104, an identity of the user is matched and recognized by comparing the collected behavior characteristic information with original characteristic information in the respective dimensions.

The original characteristic information is behavior characteristic information collected or set previously and can be used as historical statistic information associated with the user. It can be compared with the newly collected behavior characteristic information so as to determine whether the newly collected behavior characteristic information matches the user's habit.

The embodiment of the present disclosure provides a method for identity authentication. In addition to authentication based on identity authentication information, behavior characteristic information indicative of a user's habit is used to analyze the user's behavior habit, so as to determine whether the user currently logging in is consistent with a historical user. When compared with the conventional single authentication scheme, it is possible to improve the security and accuracy of the identity authentication.

Figure 2:
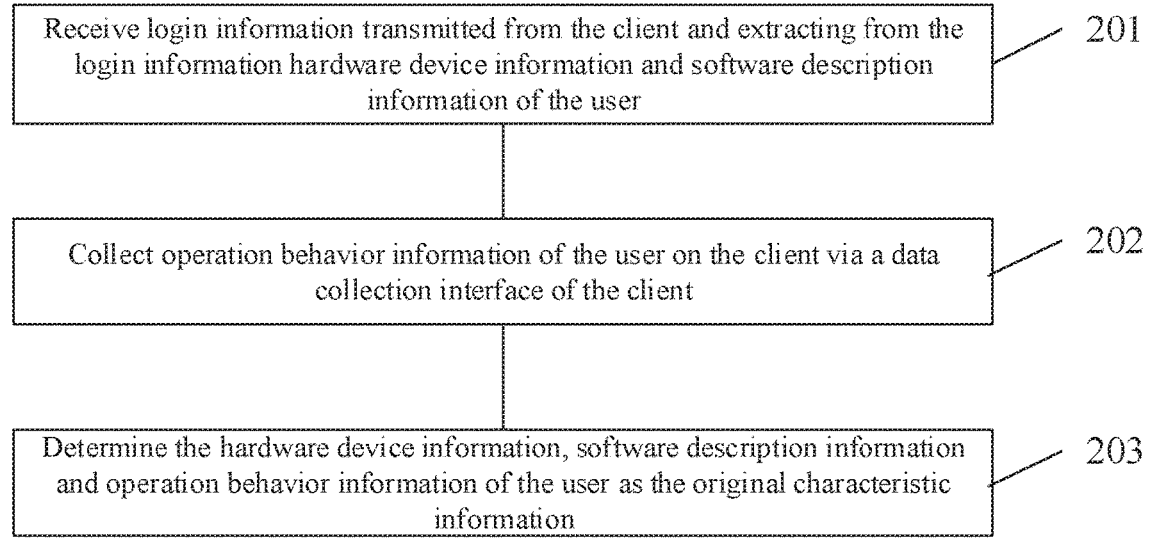
FIG. 2 is a flowchart illustrating another method for identity authentication according to an embodiment of the present disclosure.

Further, in an embodiment of the present disclosure, an implementation process for obtaining the original characteristic information is provided. As shown in FIG. 2, the process includes the following steps.

At 201, login information transmitted from the client is received and hardware device information and software description information of the user are extracted from the login information.

The hardware device information and software description information belong to static information and can thus be collected directly when the user logs in. For example, they can be collected by the client and transmitted to the server in a login request or an authentication request. Alternatively, they can be transmitted to the server from the client via a dedicated interface (e.g., API) between the client and the server.

It is to be noted here that, in order to protect the user's privacy, in an embodiment of the present disclosure, the hardware device information, software description information and operation behavior information can be collected only when it is authorized by the user. In particular, the authorization can be performed during a client install process, an account registration process or the like.

At 202, operation behavior information of the user on the client is collected via a data collection interface of the client.

The operation behavior information is information on the user's operation on the client and thus needs to be collected periodically. In particular, it can be collected every minute or every hour.

At 203, the hardware device information, software description information and operation behavior information of the user are determined as the original characteristic information.

The hardware device information, software description information and operation behavior information need to be stored in respective entries in association with the user, for later search and processing.

Figure 3:
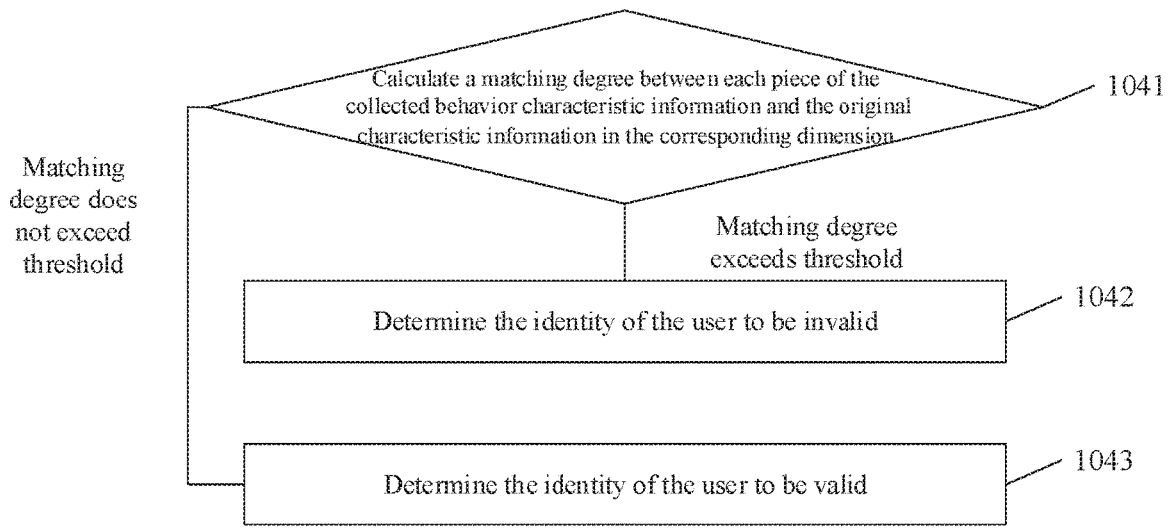
FIG. 3 is a flowchart illustrating yet another method for identity authentication according to an embodiment of the present disclosure.

Further, in an embodiment of the present disclosure, the step 104 of matching and recognizing the identity of the user by comparing the collected behavior characteristic information with the original characteristic information in the respective dimensions may include the following process. As shown in FIG. 3, the process includes the following steps.

At 1041, a matching degree between each piece of the collected behavior characteristic information and the original characteristic information in the corresponding dimension is calculated. When the matching degree corresponding to at least one piece of the behavior characteristic information exceeds a specified threshold, the process proceeds with step 1042; otherwise it proceeds with step 1043.

For the static information such as the hardware device information and software description information, the behavior characteristic information and the original characteristic information collected in the respective dimensions are both deterministic values. Hence, generally there will be two matching degrees, "same" and "different", as the matching results. Accordingly, "same" and "different" can be directly represented by 0 and 100%, respectively. In this case, the specified threshold can be set as 100%.

For the dynamic information such as the operation behavior information, the information collected in the respective dimensions could vary dynamically. However, when the magnitude of such variation does not affect the trend of the overall user behavior, it can be considered that the magnitude is within a normal variation range of the user's operation. Hence, the ratio of the magnitude of the variation to the original characteristic information can be defined as the matching degree. Further, a dynamic range can be set for the specified threshold for the operation behavior information. A matching degree within the range can indicate that the behavior is valid and belongs to the same user's operation. A matching degree beyond the range can indicate that the behavior is invalid and does not belong to the same user's operation.

In particular, when the matching degree is calculated, a large amount of historical data regarding the identity characteristic information of the user can be categorized by means of clustering analysis. Then, a mathematical model can be created based on a neural network or a Bayes method. Finally, after the preset threshold is obtained, the matching degree can be calculated based on weights of the respective types of identity characteristics in combination with the mathematical model. Further details of the calculation will be omitted here for simplicity.

At 1042, the identity of the user is determined to be invalid.

At 1043, the identity of the user is determined to be valid.

Further, the stored original characteristic information and the corresponding specified threshold can be updated based on the collected behavior characteristic information and a corresponding result of the matching and recognizing of the identity.

Figure 4:
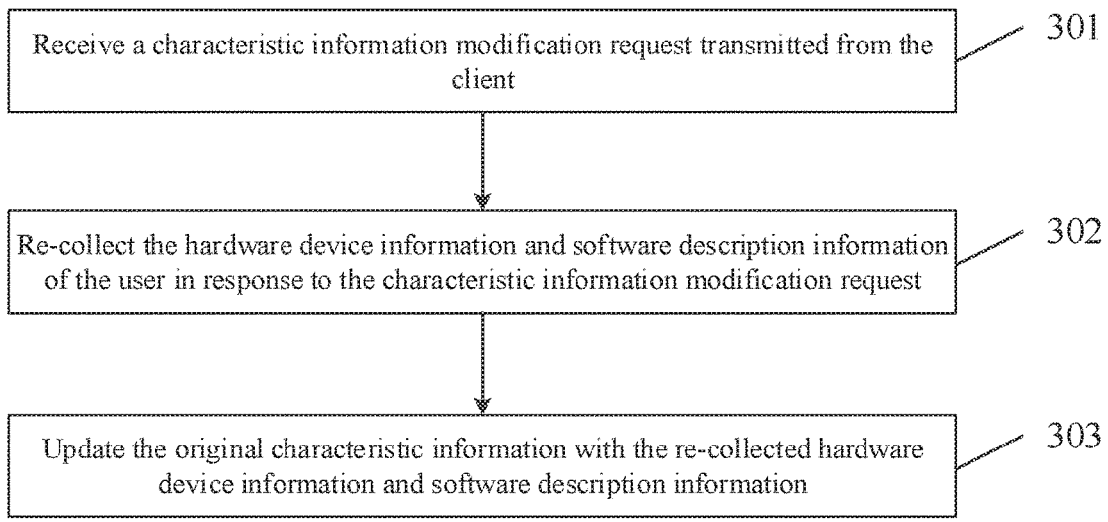
FIG. 4 is a flowchart illustrating still another method for identity authentication according to an embodiment of the present disclosure.

Further, it is to be noted that, when the user is using one application, he/she may change his/her mobile phone, change the access network or log in at different geographical locations. Accordingly, it is desired to provide the user with a mechanism for changing the original characteristic information stored at the server, so as to avoid incorrect identification. A corresponding process is shown in FIG. 4 and includes the following steps.

At 301, a characteristic information modification request transmitted from the client is received.

At 302, the hardware device information and software description information of the user are re-collected in response to the characteristic information modification request.

At 303, the original characteristic information is updated with the re-collected hardware device information and software description information.

Figure 5:
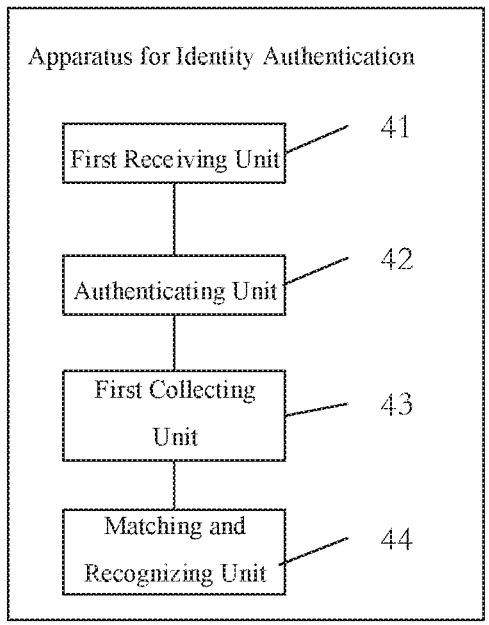
FIG. 5 is a block diagram of an apparatus for identity authentication according to an embodiment of the present disclosure.

According to an embodiment of the present disclosure, an apparatus for identity authentication is provided. As shown in FIG. 5, the apparatus includes:

a first receiving unit 41 configured to receive an authentication request transmitted from a client, the authentication request carrying identity authentication information of a user;

an authenticating unit 42 configured to authenticate the identity authentication information;

a first collecting unit 43 configured to collect behavior characteristic information related to the user in a number of dimensions when the identity authentication information is determined to be valid; and a matching and recognizing unit 44 configured to match and recognize an identity of the user by comparing the collected behavior characteristic information with original characteristic information in the respective dimensions.

Figure 6:
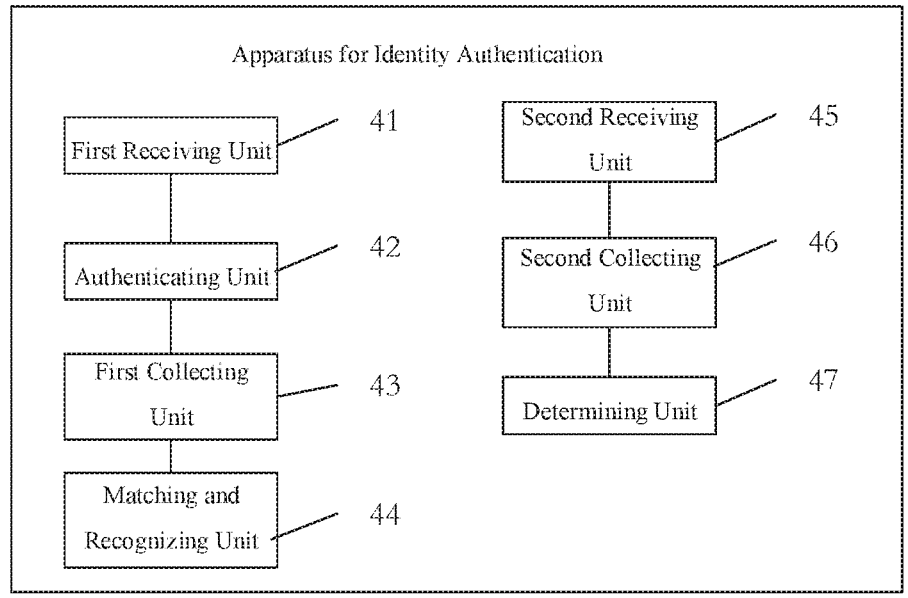
FIG. 6 is a block diagram of another apparatus for identity authentication according to an embodiment of the present disclosure.

Optionally, as shown in FIG. 6, the apparatus can further include:

a second receiving unit 45 configured to receive login information transmitted from the client and extract from the login information hardware device information and software description information of the user;

a second collecting unit 46 configured to collect operation behavior information of the user on the client via a data collection interface of the client; and a determining unit 47 configured to determine the hardware device information, software description information and operation behavior information of the user as the original characteristic information.

Figure 7:
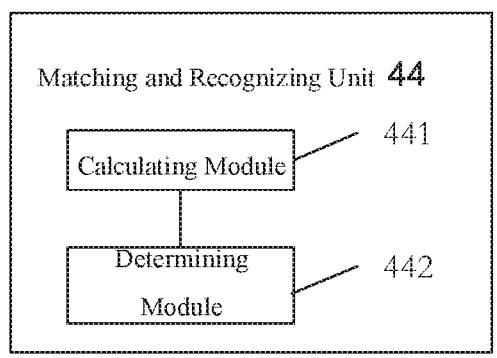
FIG. 7 is a block diagram of yet another apparatus for identity authentication according to an embodiment of the present disclosure.

Optionally, as shown in FIG. 7, the matching and recognizing unit 44 can include:

a calculating module 441 configured to calculate a matching degree between each piece of the collected behavior characteristic information and the original characteristic information in the corresponding dimension; and a determining module 442 configured to determine the identity of the user to be invalid when the matching degree corresponding to at least one piece of the behavior characteristic information exceeds a specified threshold, and determine the identity of the user to be valid when the matching degree corresponding to none of the behavior characteristic information exceeds the specified threshold.

Figure 8:
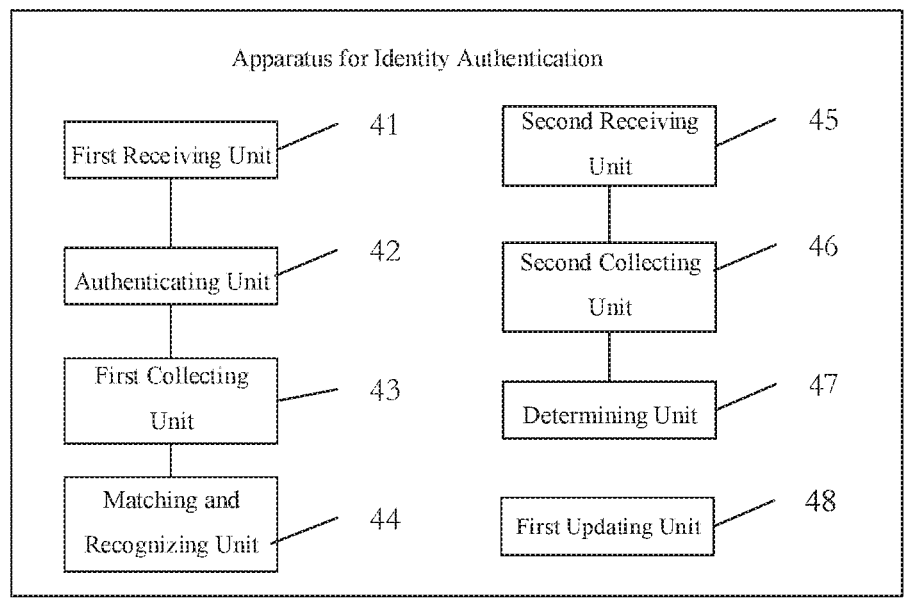
FIG. 8 is a block diagram of still another apparatus for identity authentication according to an embodiment of the present disclosure.

Optionally, as shown in FIG. 8, the apparatus can further include:

a first updating unit 48 configured to update the stored original characteristic information and the corresponding specified threshold based on the collected behavior characteristic information and a corresponding result of the matching and recognizing of the identity.

Figure 9:
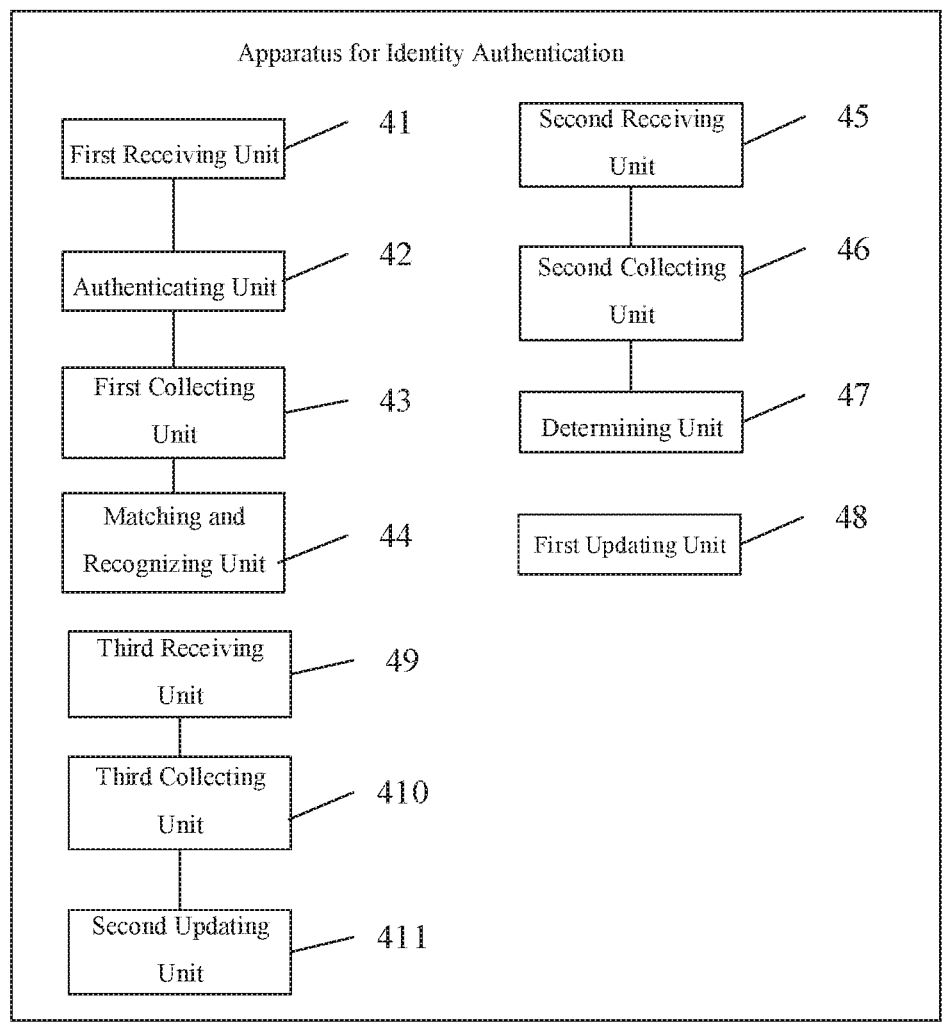
FIG. 9 is a block diagram of still yet another apparatus for identity authentication according to an embodiment of the present disclosure.

Optionally, as shown in FIG. 9, the apparatus can further include:

a third receiving unit 49 configured to receive a characteristic information modification request transmitted from the client;

a third collecting unit 410 configured to re-collect the hardware device information and software description information of the user in response to the characteristic information modification request; and a second updating unit 411 configured to update the original characteristic information with the re-collected hardware device information and software description information.

The embodiment of the present disclosure provides an apparatus for identity authentication. In addition to authentication based on identity authentication information, behavior characteristic information indicative of a user's habit is used to analyze the user's behavior habit, so as to determine whether the user currently logging in is consistent with a historical user. When compared with the conventional single authentication scheme, it is possible to improve the security and accuracy of the identity authentication.

Figure 10:
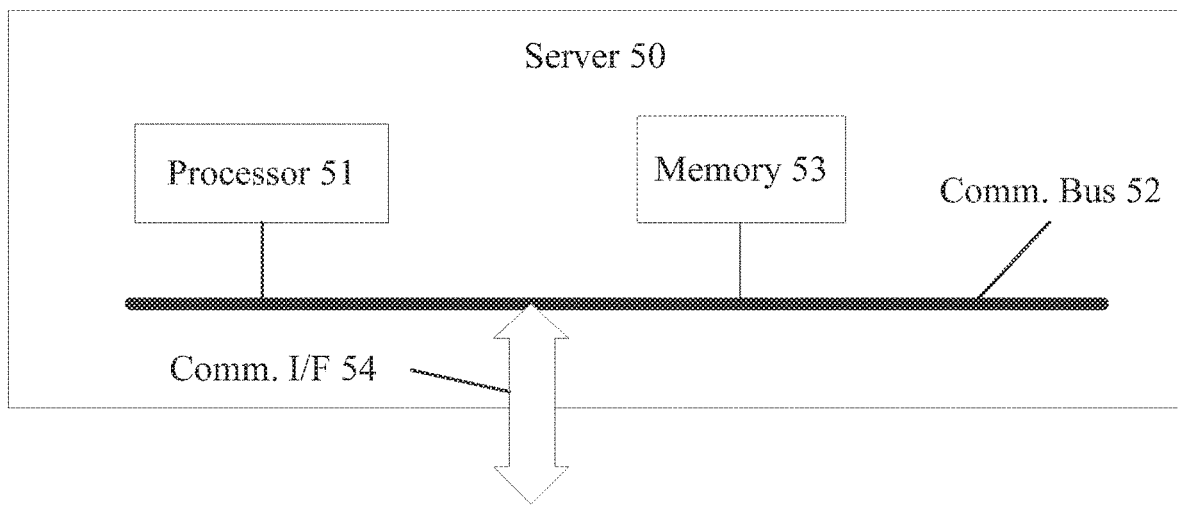
FIG. 10 is a block diagram of a server according to an embodiment of the present disclosure.

According to an embodiment of the present disclosure, a server 50 is provided. As shown in FIG. 10, the server 50 includes at least one processor 51, a communication bus 52, a memory 53 and at least one communication interface 54.

The processor 51 can be a general purpose Central Processing Unit (CPU), a micro-processor, an Application Specific Integrated Circuit (ASIC) or one or more integrated circuits for controlling execution of a program according to the present disclosure.

The communication bus 52 can include a path on which the above components can communicate information.

The communication interface 54 can use any transceiver for communicating with other devices or communication networks, such as Ethernet, Radio Access Network (RAN), or Wireless Local Area Network (WLAN).

The memory 53 can be, but not limited to, a Read-Only Memory (ROM) or any other type of static storage device capable of storing static information and instructions, a Random Access Memory (RAN) or any other type of dynamic storage device capable of storing information and instructions, an Electrically Erasable Programmable ROM (EEPROM), a Compact Disc ROM (CD-ROM) or other optical disc memory (including CD, laser disc, optical disc, Digital Versatile Disc (DVD) or Blue-Ray Disc), a magnetic storage medium or other magnetic storage device, or any other medium capable of carrying or storing desired program codes in form of instructions or data structures and accessible by a computer. The memory can be standalone and connected to the processor via the bus, or integrated with the processor.

Here, the memory 53 stores application program codes executable by the processor 51 for performing the solutions of the present disclosure. The processor 51 executes the application program codes stored in the memory 53. When the server is running, the processor 51 executes the computer executable instructions stored in the memory 53 such that the server can: receive an authentication request transmitted from a client, the authentication request carrying identity authentication information of a user; authenticate the identity authentication information; collect behavior characteristic information related to the user in a number of dimensions when the identity authentication information is determined to be valid; and match and recognize an identity of the user by comparing the collected behavior characteristic information with original characteristic information in the respective dimensions.

Optionally, the method can further include, prior to receiving the authentication request transmitted from the client: receiving login information transmitted from the client and extracting from the login information hardware device information and software description information of the user; collecting operation behavior information of the user on the client via a data collection interface of the client; and determining the hardware device information, software description information and operation behavior information of the user as the original characteristic information.

Optionally, the operation of matching and recognizing the identity of the user by comparing the collected behavior characteristic information with the original characteristic information in the respective dimensions can include: calculating a matching degree between each piece of the collected behavior characteristic information and the original characteristic information in the corresponding dimension; determining the identity of the user to be invalid when the matching degree corresponding to at least one piece of the behavior characteristic information exceeds a specified threshold; and determining the identity of the user to be valid when the matching degree corresponding to none of the behavior characteristic information exceeds the specified threshold.

Optionally, the method can further include, subsequent to matching and recognizing the identity of the user by comparing the collected behavior characteristic information with the original characteristic information in the respective dimensions: updating the stored original characteristic information and the corresponding specified threshold based on the collected behavior characteristic information and a corresponding result of the matching and recognizing of the identity.

Optionally, the method can further include: receiving a characteristic information modification request transmitted from the client; re-collecting the hardware device information and software description information of the user in response to the characteristic information modification request; and updating the original characteristic information with the re-collected hardware device information and software description information.

The embodiment of the present disclosure provides a server. In addition to authentication based on identity authentication information, behavior characteristic information indicative of a user's habit is used to analyze the user's behavior habit, so as to determine whether the user currently logging in is consistent with a historical user. When compared with the conventional single authentication scheme, it is possible to improve the security and accuracy of the identity authentication.

According to an embodiment of the present disclosure, a computer readable storage medium is provided. The computer readable storage medium has a computer program stored thereon. The program, when executed by a processor, causes the processor to perform the following method steps of: receiving an authentication request transmitted from a client, the authentication request carrying identity authentication information of a user; authenticating the identity authentication information; collecting behavior characteristic information related to the user in a number of dimensions when the identity authentication information is determined to be valid; and matching and recognizing an identity of the user by comparing the collected behavior characteristic information with original characteristic information in the respective dimensions.

Optionally, the method can further include, prior to receiving the authentication request transmitted from the client: receiving login information transmitted from the client and extracting from the login information hardware device information and software description information of the user; collecting operation behavior information of the user on the client via a data collection interface of the client; and determining the hardware device information, software description information and operation behavior information of the user as the original characteristic information.

Optionally, the operation of matching and recognizing the identity of the user by comparing the collected behavior characteristic information with the original characteristic information in the respective dimensions can include: calculating a matching degree between each piece of the collected behavior characteristic information and the original characteristic information in the corresponding dimension; determining the identity of the user to be invalid when the matching degree corresponding to at least one piece of the behavior characteristic information exceeds a specified threshold; and determining the identity of the user to be valid when the matching degree corresponding to none of the behavior characteristic information exceeds the specified threshold.

Optionally, the method can further include, subsequent to matching and recognizing the identity of the user by comparing the collected behavior characteristic information with the original characteristic information in the respective dimensions: updating the stored original characteristic information and the corresponding specified threshold based on the collected behavior characteristic information and a corresponding result of the matching and recognizing of the identity.

Optionally, the method can further include: receiving a characteristic information modification request transmitted from the client; re-collecting the hardware device information and software description information of the user in response to the characteristic information modification request; and updating the original characteristic information with the re-collected hardware device information and software description information.

The embodiment of the present disclosure provides a computer readable medium. In addition to authentication based on identity authentication information, behavior characteristic information indicative of a user's habit is used to analyze the user's behavior habit, so as to determine whether the user currently logging in is consistent with a historical user. When compared with the conventional single authentication scheme, it is possible to improve the security and accuracy of the identity authentication.

It can be appreciated by those skilled in the art that, for the operations of the above described systems, apparatuses and units, reference can be made to the corresponding processes described in connection with the above method embodiments and details thereof will be omitted here for the sake of convenience and simplicity.

It can be appreciated from the embodiments of the present disclosure that the disclosed systems, apparatuses and methods can be implemented in alternative ways. The apparatus embodiments as described above are illustrative only. For example, while the units have been divided in accordance with their logical functions, other divisions are possible in practice. For example, more than one unit or element can be combined or can be integrated into another system, or some features can be ignored or omitted. In addition, the coupling, direct coupling or communicative connection between various components as shown or discussed can be an indirect coupling or communicative connection via some interface, device or unit and can be electrical, mechanical or in another form.

The units described above as separated may or may not be physically separated. The components shown as units may or may not be physical units. They can be co-located or can be distributed over a number of network elements. Depending on actual requirements, some or all of the units can be selected to achieve the object of the present disclosure.

Further, all the functional units in various embodiments of the present disclosure can be integrated within one processing unit, each of these units can be a separate unit, or two or more units can be integrated into one unit. Such integrated unit can be implemented in hardware, possibly in combination with software functional units.

The above integrated units, when implemented in software function units, can be stored in a computer readable storage medium. The software function units can be stored in a storage medium, which may be any of various mediums capable of storing program codes, such as a USB disk, a mobile hard disk, a Read Only Memory (ROM), a Random Access Memory (RAM), a magnetic disk or an optical disc or the like, containing instructions which cause a computer device (which can be a personal computer, a server, a network device or the like) to perform at least a portion of the steps of the methods according to the embodiments of the present disclosure.

While the preferred embodiments of the present disclosure have been described above, the scope of the present disclosure is not limited thereto. Various modifications, equivalent alternatives or improvements can be made by those skilled in the art without departing from the scope of the present disclosure. These modifications, equivalent alternatives and improvements are to be encompassed by the scope of the present disclosure.

What is claimed is:

1. A method for identity authentication, comprising:
receiving an authentication request transmitted from a client, the authentication request carrying identity authentication information of a user;
authenticating the identity authentication information;
collecting behavior characteristic information related to the user in a number of dimensions when the identity authentication information is determined to be valid; and
matching and recognizing an identity of the user by comparing the collected behavior characteristic information with original characteristic information in a respective one of the dimensions,
wherein said matching and recognizing the identity of the user by comparing the collected behavior characteristic information with the original characteristic information in the respective dimensions comprises:
calculating a matching degree between each piece of the collected behavior characteristic information and the original characteristic information in the corresponding dimension;
determining the identity of the user to be invalid when the matching degree corresponding to at least one piece of the behavior characteristic information exceeds a specified threshold; and
determining the identity of the user to be valid when the matching degree corresponding to none of the behavior characteristic information exceeds the specified threshold.

2. The method of claim 1, further comprising, prior to receiving the authentication request transmitted from the client:
receiving login information transmitted from the client and extracting from the login information hardware device information and software description information of the user;
collecting operation behavior information of the user on the client via a data collection interface of the client; and determining the hardware device information, software description information and operation behavior information of the user as the original characteristic information.

3. The method of claim 2, further comprising:
receiving a characteristic information modification request transmitted from the client;
re-collecting the hardware device information and software description information of the user in response to the characteristic information modification request; and
updating the original characteristic information with the re-collected hardware device information and software description information.

4. The method of claim 1, further comprising, subsequent to matching and recognizing the identity of the user by comparing the collected behavior characteristic information with the original characteristic information in the respective dimensions:
updating the stored original characteristic information and the corresponding specified threshold based on the collected behavior characteristic information and a corresponding result of the matching and recognizing of the identity.

5. The method of claim 1, wherein the behavior characteristic information comprises hardware device information, software description information, and operation behavior information, wherein the hardware device information comprise at least one of a physical location of a user device, a network environment where the user device accesses, a device model, a processor model, a model of a memory, specification of the memory, and capacity of the memory, or a screen size of the user device;
the software description information comprises at least one of a name of the client, storage path of the client, version number of the client, operating system type of the client, operating system version of the client, or a language used in the client; and
the operation behavior information comprises at least one of a sliding trajectory of a touch operation by the user on a touch screen, a consumption or payment behavior on the client, or behaviors of processing various operation objects in applications.

6. A server, comprising a processor, a memory, a communication interface and a bus, wherein that the memory stores computer executable instructions, the processor is connected to the memory via the bus, and when the server is operating, the processor executes the computer executable instructions stored in the memory to cause the server to:
receive an authentication request transmitted from a client, the authentication request carrying identity authentication information of a user;
authenticate the identity authentication information;
collect behavior characteristic information related to the user in a number of dimensions when the identity authentication information is determined to be valid; and
match and recognize an identity of the user by comparing the collected behavior characteristic information with original characteristic information in a respective one of the dimensions,
wherein said matching and recognizing the identity of the user by comparing the collected behavior characteristic information with the original characteristic information in the respective dimensions comprises:
calculating a matching degree between each piece of the collected behavior characteristic information and the original characteristic information in the corresponding dimension;
determining the identity of the user to be invalid when the matching degree corresponding to at least one piece of the behavior characteristic information exceeds a specified threshold; and
determining the identity of the user to be valid when the matching degree corresponding to none of the behavior characteristic information exceeds the specified threshold.

7. The server of claim 6, wherein the processor further executes the computer executable instructions stored in the memory to cause the server to, prior to receiving the authentication request transmitted from the client:
receive login information transmitted from the client and extracting from the login information hardware device information and software description information of the user;
collect operation behavior information of the user on the client via a data collection interface of the client; and
determine the hardware device information, software description information and operation behavior information of the user as the original characteristic information.

8. The server of claim 7, the processor further executes the computer executable instructions stored in the memory to cause the server to:
receive a characteristic information modification request transmitted from the client;
re-collect the hardware device information and software description information of the user in response to the characteristic information modification request; and
update the original characteristic information with the re-collected hardware device information and software description information.

9. The server of claim 6, wherein the processor further executes the computer executable instructions stored in the memory to cause the server to, subsequent to matching and recognizing the identity of the user by comparing the collected behavior characteristic information with the original characteristic information in the respective dimensions:
update the stored original characteristic information and the corresponding specified threshold based on the collected behavior characteristic information and a corresponding result of the matching and recognizing of the identity.

10. The server of claim 6, wherein the behavior characteristic information comprises hardware device information, software description information, and operation behavior information, wherein the hardware device information comprise at least one of a physical location of a user device, a network environment where the user device accesses, a device model, a processor model, a model of a memory, specification of the memory, and capacity of the memory, or a screen size of the user device;
the software description information comprises at least one of a name of the client, storage path of the client, version number of the client, operating system type of the client, operating system version of the client, or a language used in the client; and
the operation behavior information comprises at least one of a sliding trajectory of a touch operation by the user on a touch screen, a consumption or payment behavior on the client, or behaviors of processing various operation objects in applications.

11. A non-transitory computer readable medium having a computer program stored thereon, the program, when executed by a processor, causes the processor to:
- receive an authentication request transmitted from a client, the authentication request carrying identity authentication information of a user;
- authenticate the identity authentication information;
- collect behavior characteristic information related to the user in a number of dimensions when the identity authentication information is determined to be valid; and
- match and recognize an identity of the user by comparing the collected behavior characteristic information with original characteristic information in a respective one of the dimensions,
- wherein said matching and recognizing the identity of the user by comparing the collected behavior characteristic information with the original characteristic information in the respective dimensions comprises:
- calculating a matching degree between each piece of the collected behavior characteristic information and the original characteristic information in the corresponding dimension;
- determining the identity of the user to be invalid when the matching degree corresponding to at least one piece of the behavior characteristic information exceeds a specified threshold; and
- determining the identity of the user to be valid when the matching degree corresponding to none of the behavior characteristic information exceeds the specified threshold.

12. The non-transitory computer readable medium of claim 11, wherein the program further causes the processor to, prior to receiving the authentication request transmitted from the client:
- receive login information transmitted from the client and extracting from the login information hardware device information and software description information of the user;
- collect operation behavior information of the user on the client via a data collection interface of the client; and
- determine the hardware device information, software description information and operation behavior information of the user as the original characteristic information.

13. The non-transitory computer readable medium of claim 12, the program further causes the processor to:
- receive a characteristic information modification request transmitted from the client;
- re-collect the hardware device information and software description information of the user in response to the characteristic information modification request; and
- update the original characteristic information with the re-collected hardware device information and software description information.

14. The non-transitory computer readable medium of claim 11, wherein the program further causes the processor to, subsequent to matching and recognizing the identity of the user by comparing the collected behavior characteristic information with the original characteristic information in the respective dimensions:
- update the stored original characteristic information and the corresponding specified threshold based on the collected behavior characteristic information and a corresponding result of the matching and recognizing of the identity.

15. The non-transitory computer readable medium of claim 11, wherein the behavior characteristic information comprises hardware device information, software description information, and operation behavior information, wherein the hardware device information comprise at least one of a physical location of a user device, a network environment where the user device accesses, a device model, a processor model, a model of a memory, specification of the memory, and capacity of the memory, or a screen size of the user device;
- the software description information comprises at least one of a name of the client, storage path of the client, version number of the client, operating system type of the client, operating system version of the client, or a language used in the client; and
- the operation behavior information comprises at least one of a sliding trajectory of a touch operation by the user on a touch screen, a consumption or payment behavior on the client, or behaviors of processing various operation objects in applications.

* * * * *